Jan. 9, 1940.  W. D. BUCKINGHAM  2,186,006
BALANCING DUPLEX CIRCUIT
Filed Sept. 27, 1935  3 Sheets-Sheet 1

INVENTOR
W. D. BUCKINGHAM.
BY
Eugene C. Brown
ATTORNEY

Jan. 9, 1940.  W. D. BUCKINGHAM  2,186,006
BALANCING DUPLEX CIRCUIT
Filed Sept. 27, 1935  3 Sheets-Sheet 3

INVENTOR
W. D. BUCKINGHAM
BY Eugene C. Brown
ATTORNEY

Patented Jan. 9, 1940

2,186,006

UNITED STATES PATENT OFFICE 2,186,006

BALANCING DUPLEX CIRCUIT

William D. Buckingham, Southampton, N. Y., assignor to The Western Union Telegraph Company, New York, N. Y., a corporation of New York Application September 27, 1935, Serial No. 42,500

34 Claims. (Cl. 178—58)

This invention relates to the balancing of signalling circuits and the like, and more particularly to a method of and means for indicating, analyzing and correcting unbalanced conditions in electrical circuits or apparatus more rapidly and with a greater degree of accuracy than has been obtained heretofore in practice.

The primary object of this invention is to provide an improved and more accurate means of detecting and locating unbalance in circuits such as duplex signalling circuits, and a method of employing such means which may form the basis of a new technique in the balancing and use of such circuits for telegraph or other types of signals because of the greatly improved balance that may be effected and maintained by utilizing this method.

As is well understood in the art, a duplexed signal circuit is one arranged so that messages or signals may be transmitted in both directions over a single circuit at the same time. For telegraph purposes such a circuit is usually operated over a single metallic conductor with an earth return. Means are provided at each end of the conductor by which the receiving instrument at that end does not respond to signals originating at the receiving end but only to those signals originating at the distant end. This is accomplished by dividing the outgoing current by differentiation or the use of a bridge circuit arrangement into equal or proportional parts and providing an artificial line simulating the actual line or conductor so that the propagation of a signal wave through the actual line and the artificial line is substantially the same. When this condition obtains for the bridge circuit arrangement, a receiving instrument across the conjugate points of the bridge will not be affected by the outgoing signals. However, if the characteristics of the artificial line do not match those of the real line, the propagation of such signal current is not equal at all instants in the signal cycle, and the unbalanced condition will cause a flow of current across the bridge. Corresponding disturbances would occur in differentially duplexed circuits.

As is well known, duplex operation of the signal circuit may be applied either to land lines or to ocean cables. In the latter instance, because of the small current used and the changing conditions to which the cables are subjected, the problem of obtaining and maintaining approximate balance is extremely difficult.

Although artificial lines are constructed according to mathematical calculations, they are nevertheless only an approximation of the real line and considerable manipulation and adjustment of the artificial line is necessary before a working balance, particularly in a cable circuit, can be established. Such a balance is not permanent because of widely varying conditions which affect the electrical properties of cables of great length submerged beneath the surface of the seas, and frequent readjustments of the artificial line are necessary. In the earlier stages of the art of duplex circuits, particularly as applied to cables, the obtaining of a balance was a long and tedious process, primarily because of the fact that no reliable means of indicating the exact conditions of unbalance were available. The state of balance between the cable and the artificial line was then judged entirely by the performance of the relay and receiving apparatus which by their very nature were designed to be insensitive to unbalanced conditions. In an effort to show more clearly the actual unbalanced conditions a string oscillograph method of picturing the unbalance has been employed. This expedient, however, represented only a slight improvement over the previous methods because of the lack of sensitivity of the instrument, the time delay in obtaining the oscillographic picture and the difficulty in interpreting such a picture in the terms of position and sense of the unbalanced portion of the artificial line.

According to this invention apparatus is provided for picturing or forming a steady and continuous pattern or time-current graph of the unbalanced condition which represents the relative instantaneous values of the current propagation in the actual and artificial lines or other elements to be balanced throughout the entire signal cycle or any desired portion thereof. According to this invention this pattern not only shows the instantaneous values just referred to, but by an easy, rapid and continued interpolation, the sense or type of unbalance, together with an accurate location of the points of unbalance in the artificial line for all portions of the artificial circuit may be obtained.

A further feature of the invention involves a new method and technique of rapid and accurate balancing of electrical elements, such for example as duplex circuits, of which the cable circuit is the most complicated type.

It is an object of this invention, therefore, to devise a method with the use of appropriate improved apparatus herein described, for obtaining within a relatively short space of time a higher degree of accuracy of balance or simulation at all points between the actual and artificial line of duplex circuits.

It is a further object of this invention to devise a method for obtaining a more accurate balance in a signalling circuit in order that a working balance may be maintained for a longer period of time than has been possible heretofore.

Another object of the invention is to provide apparatus which will indicate unbalance with great accuracy, thus eliminating uncertainty in the determination of the same.

Another object of the invention is to provide means for indicating unbalance in such a manner that it may be easily read and interpreted and further to provide means which will give a sustained indication from recurring signals.

A further object of the invention is to provide means for indicating at the same time the position, the nature, and the direction of unbalance.

A further object of the invention is to provide means which will detect and indicate whether the unbalance is inductive, capacitative, or resistive.

A further object of the invention is to provide means for indicating quickly and accurately the effect of a correction made in the artificial line in an attempt to establish accurate balance.

A further object of the invention is to provide means to give a visual graphic representation of the relative propagation of a signal wave or any desired portion thereof over the actual and artificial lines.

A still further object of the invention is to provide means for forming a symmetrical pattern representing the unbalance current whereby parasitic currents flowing through the line or cable may be distinguished from the unbalance current.

These and other objects of this invention will be apparent from the following description and claims taken in connection with the accompanying drawings, in which:

It has been found in accordance with this invention that the cathode ray tube when provided with suitable associated circuit apparatus, such as hereinafter described, may be arranged to project upon its screen a steady pattern continuously observed and interpolated to give both the sense and amount of unbalance. Due to the fact that it represents the substantially instantaneous condition, it may serve as a check indicator of whether the adjustments to improve the balance are being made at the proper point in the circuit and of the proper amount and direction. By the employment of this method a rapidity of attainment of balance together with a greater degree of accuracy than previously known in the art has been obtained.

A vacuum tube amplifier may also be employed as a part of the test circuit apparatus and may be coupled between the cathode ray tube and the signal circuit for amplifying the unbalance potentials. It is particularly useful as the refinement of the balance proceeds in amplifying the small remaining unbalances in such a manner as to make them stand out in the screen pattern, thus facilitating the determination of the adjustment required in the most difficult part of the balancing procedure where the adjustments are critical and of exceedingly small values.

Figure 1:
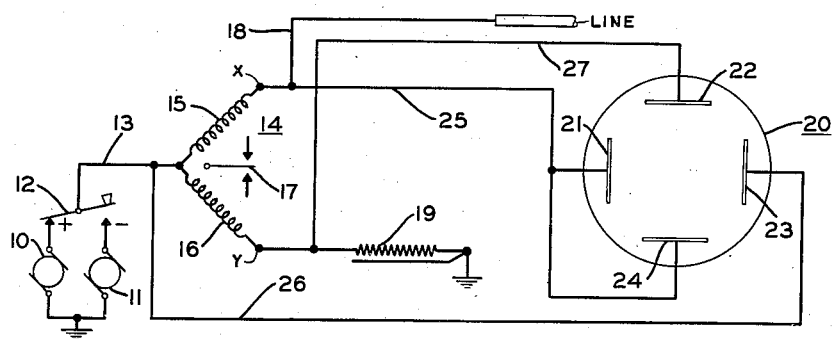
Fig. 1 is a circuit diagram of a simple duplex circuit having associated therewith a balance indicating device embodying features of the present invention.
Figures 10, 11, 12, 13:
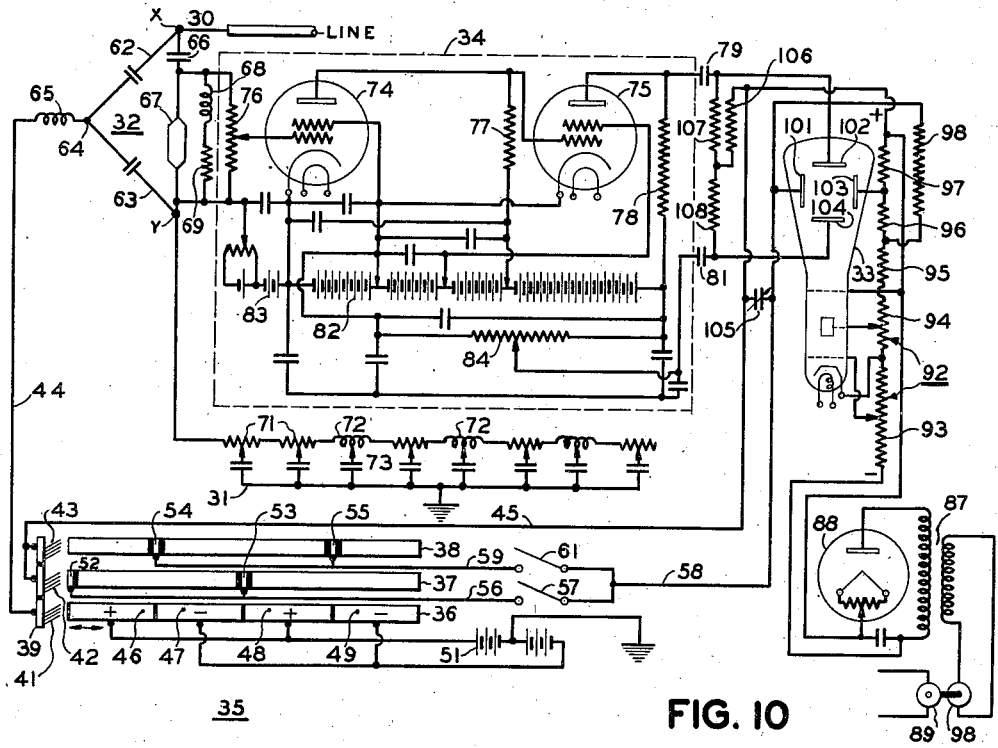
Fig. 10 is a circuit diagram of a bridge type duplex circuit having a modified balance indicating device associated therewith.
Fig. 11 illustrates patterns produced with the arrangement of Fig. 10 when excess capacity is introduced at various points in the artificial line.
Fig. 12 illustrates patterns produced by capacity unbalance occurring at two spaced points along the artificial line.
Fig. 13 illustrates patterns produced by resistance unbalance alone and resistance and capacity unbalance.

Three embodiments of apparatus associated with the cathode ray oscillograph for carrying out the improved method of balancing according to this invention as applied to duplex signaling circuits will be described herein. It is to be understood, however, that the invention is not limited to such application or the particular apparatus described. For a complete understanding of the invention Figs. 1 and 10 may be considered somewhat complementary to each other. The showing in Fig. 1 is extremely simple and largely schematic. On the other hand, Fig. 10 illustrates a preferred form of the apparatus and somewhat in detail. The type of screen pattern produced by the apparatus arranged according to Fig. 1 is illustrated and explained by reference to Figs. 2 to 9, while that produced by the arrangement of the apparatus illustrated in Fig. 10 is explained by reference to Figs. 11 to 15.

A cathode ray tube and associated apparatus required for the balancing of a simple differential duplex circuit will now be described, reference being had to the diagrammatic illustration of Fig. 1. Since duplex circuits are balanced separately at each end, it is only necessary for purposes of illustration to deal with the apparatus at one end of the line only and the drawings are accordingly so restricted. The apparatus at one end of the line comprises a source of positive potential 10, a source of negative potential 11, and a key 12 for alternately connecting positive and negative potential in the circuit. The key 12 may be operated either manually or mechanically (as hereinafter described in connection with Fig. 10). For balancing operations the key may be operated continuously to impose a continually alternating current upon the circuit. The key 12 is connected through wire 13 to the common point of the ratio arms of a differential relay 14 comprising opposing coils 15 and 16. The incoming signals are reproduced in the relay by a tongue 17 operating between suitable contacts. The upper and lower conjugate points X and Y of the relay circuit are connected to the real line 18 and artificial line 19, respectively.

A cathode ray tube 20 provides the means for indicating the condition of the balance between the real and artificial lines. The tube is preferably connected so that the propagation of the signals along the real line produces a horizontal sweep of the electron stream or light spot on the screen, and the unbalance potentials across the receiving or recording device 14 produce vertical deflections or deflections laterally of the normal axis of the screen pattern. The preferred form of the cathode ray tube is the type in which the electron beam is deflected or controlled by potentials imposed upon quadrant plates illustrated as plates 21, 22, 23 and 24.

In actual use an amplifier will usually be connected between the cathode ray tube 20 and the source of unbalance potentials. This has been omitted in Fig. 1, however, for the sake of simplicity and the plates of the cathode ray tube have been connected directly to the circuit. An amplifier similar to that to be described in connection with Fig. 10 is preferred.

The cathode ray tube, as is well known by those skilled in the art, comprises a pear-shaped glass vessel having a luminescent screen which may be formed upon the substantially flat end surface upon which an electron beam impinges. For the purposes of this invention the flattened end surface is preferably provided with a retentive screen, such that a sustained pattern will be formed upon the screen so long as the recurring signals sent out over the line produce the same trace. A fluorescent and phosphorescent screen of the highly retentive type, such as calcium fluoride, upon which the patterns will be retained for as much as thirty to forty seconds, is preferred. A screen of this character is disclosed int the patent to Du Mont No. 2,000,014, dated May 7, 1935. As will appear further on in the description, with a highly retentive screen, changes produced by balancing adjustments may be caused to throw a new pattern upon the screen before the old pattern has faded out, which is extremely useful for comparative diagnosis of the effect of balancing manipulations.

Plates 21 and 23 of the cathode ray tube 20 which produce the sweep or horizontal displacement of the electron beam, are connected across the coil 15 of the differential relay by conductors 25 and 26, respectively. The coil 15 carries the signal current to the real line and the potential drop across this coil is employed to provide the source of sweep circuit potential. The plates 22 and 24 are connected across the conjugate points of the relay by the conductor 25 extended, and conductor 27, so that unbalance voltages appearing between the real and artificial lines produce displacements of the electron beam away from the normal axis.

The voltage drop across the coil 15 impressed upon the plates 21 and 23 sweeps the electron beam across the screen in a straight line along what may be termed the axis of the screen when there is no unbalance in the circuit. However, if any unbalance voltages exist, the electron beam or spot of light on the screen will be deflected up and down by an amount proportional to the unbalance. Thus, as the spot is being swept from side to side by the line alternations, it simultaneously moves up or down to produce humps, so to speak, on the horizontal line, the height and shape of these humps indicating the amount and sense of the unbalance, while their positions on the horizontal line indicate the places in the signal cycle where the unbalance occurs. Since the propagation of the signal current is consonant with the signal cycle, the positions in the signal cycle correspond relatively to the place or point of unbalance along the cable circuit. In other words, the front sections of the artificial line and the cable line correspond to the first part of the cycle pattern appearing on the screen, the middle section of the lines correspond to the middle part of the cycle pattern, and the end sections of the lines correspond to the last part of the cycle pattern. It is the employment of the cathode ray tube in the manner set forth by this invention that changes the problem of balancing duplex circuits from a hit-and-miss procedure to a more exact science. This feature is important because not only the amount of the unbalance, but also the direction of the unbalance and its position in the artificial line are indicated.

Since the matter of balance is more critical and more difficult to obtain in telegraph circuits and particularly cable circuits, the operation of the test apparatus is described as applied to the latter.

The method or technique of balancing a cable by the apparatus devised and employed according to each embodiment of this invention can best be explained and illustrated by an explanation of the types of patterns produced upon the screen of the cathode-ray tube when a series of known conditions of unbalance are produced. By first ascertaining the significance of the shape and form of the patterns representing different kinds of unbalance, the amount and type of unbalance of an actual artificial line can readily be arrived at from the pattern produced thereby.

Figure 2:
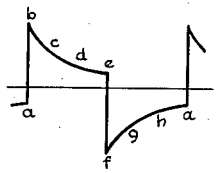
Fig. 2 illustrates the theoretical wave form of a cable reversal.

Referring to Fig. 2, the theoretical shape of a complete cycle of a singal current wave is illustrated. When reverse battery is applied at point $a$ on the cycle, the cable current rises very rapidly to point $b$. This first rush of current is caused largely by the charge taken by the capacity of the first part of the cable or line. The more distant sections of the line have their capacities separated from the head of the cable by the cable resistance and so are slower in taking their charge, causing the cycle portions $b$—$c$—$d$—$e$ to slope gradually downward toward the axis of the curve. At $e$ battery is again reversed and the current drops rapidly to $f$ duplicating $a$—$b$ in the reverse direction. From $f$ the current curve slopes again through $f$—$g$—$h$—$a$ to a point corresponding to the initial point $a$, completing the cycle.

In balancing a duplex circuit the problem is to make the current wave going to the artificial line exactly like that going to the real line. This means that the section $a$—$b$ of the current wave must be matched by adjustments at the head of the artificial line while the sections $b$—$c$—$d$—$e$ respectively must be matched by adjustments in the middle and toward the end of the artificial line.

As is well understood, an artificial line is generally composed of sections of capacity separated by resistances and sometimes inductances, the capacity condensers simulating the cable or line capacity and the resistors and inductors simulating the line resistance and inductance and producing a similar delayed charge effect. The sections of the artificial cable near the front correspond to the head of the real cable and the middle and last sections of the artificial line correspond to the middle and far end of the real cable or line.

Figure 3:
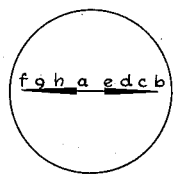
Fig. 3 is a pattern produced on the screen of the cathode ray tube when there is no unbalance between the real and artificial line.
Figure 4:
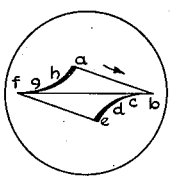
Fig. 4 is a pattern produced by an excess of capacity in the middle and distant end of the artificial line.

The visible patterns on the screen of the cathode-ray tube will vary in accordance with the relation betwen the characteristics of the real and artificial lines. If there is no unbalance the pattern will be a straight line as shown in Fig. 3, because of the fact that the only voltages applied to the quadrant plates will appear between the horizontal plates 21 and 23, since there is no potential difference between the points X and Y of Fig. 1 throughout the complete signal cycle. At the pont $a$ in the signal cycle, as shown in Fig. 2, the spot of light upon the screen produced by the electron beam will appear at point $a$ on the pattern of Fig. 3. As soon as the battery is reversed and positive potential is applied, the plate 23 of the tube becomes more positive due to the drop across the coil 15 in the upper arm of the relay causing the spot to travel rapidly to the right and assume the position represented at $b$. From the position $b$ the spot will travel more slowly from right to left as the current curve drops to position $e$ in Fig. 2 forming the portion of the pattern $b$—$c$—$d$—$e$.

It will be readily understood that where the beam travels rapidly the tracing upon the screen will be dim and where the beam travels more slowly the tracing will increase in brightness. In order to illustrate this the width of the theoretical trace is increased from $b$ to $e$ as will be seen by referring to the pattern. At $e$ on the signal cycle battery is again reversed and negative potential applied, causing the current curve to drop rapidly from $e$ to $f$ (Fig. 2). On the pattern the beam will swing rapidly to the left from $e$ to $f$. From this point as the current curve slowly rises following the line $f$—$g$—$h$—$a$ indicated in Fig. 2 the spot of light produced by the beam will travel toward the right from $f$ through $g$—$h$ to $a$. From the latter indications given in the theoretical pattern the form of the portion of the pattern corresponding to the various portions of the current curve can be readily identified. For each signal cycle the spot of light will move across the oscillograph screen in the manner just described. The screen retains the image so that the recurring movement of the spot will produce what appears to be a complete sustained pattern on the screen.

For a condition of unbalance the pattern upon the screen will be distorted from that shown in Fig. 3, the shape being determined by the amount and position of the unbalance between the real and the artificial lines. In other words, the shape will indicate the portion of the artificial line which is out of balance and as already indicated furnishes a means of ascertaining the sense and amount of unbalance.

Suppose that the balance between the main and artificial line is perfect at and near the head end corresponding to the portions of the wave $a$—$b$—$c$ but that after that the artificial line takes more current than the real cable due to the fact that the capacity in the remote part of the artificial line is greater than that of the remote part of the cable. The pattern upon the oscillograph would then look like that illustrated in Fig. 4. From $a$ to $b$ and from $b$ to $c$ the drop across the coils 15 and 16 of the relay at the sending end would be equal and the potential at the conjugate points X and Y would be the same. However, from $c$ to $d$ and $d$ to $e$ the artificial line would take more current than the real line. This would cause the drop across coil 16 to be greater than that across coil 15 making the lower plate 24 connected to the upper conjugate point X more positive than the upper plate 22 connected with the lower conjugate point Y. This would cause the spot of light to swing downwardly giving the dropping portion of the pattern from $c$ to $e$ as illustrated. The pattern for the other half of the cycle would be a duplication of this in the reverse order.

Figure 5:
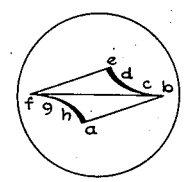
Fig. 5 is a pattern produced by an insufficiency of capacity at the middle and distant end of the artificial line.

If the opposite conditions are assumed, that is, a condition in which the artificial line takes less current due to the insufficiency of its capacity at the remote end, a pattern of the opposite form will be produced such as is illustrated in Fig. 5.

Now with the theoretical patterns in mind attention is directed to the screen patterns produced by actual conditions. Referring to Figs. 6, 7, 8 and 9, there are shown tracings of photographs of the actual screen patterns produced by apparatus set up under known conditions and in which certain known factors unbalanced the artificial line.

Figure 6:
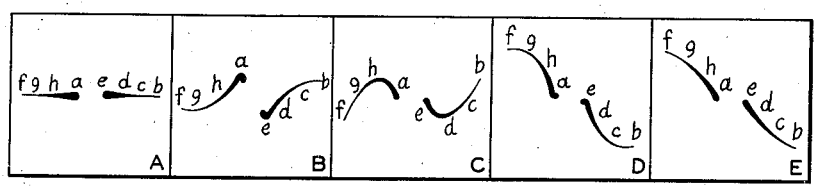
Fig. 6 illustrates patterns produced by an actual artificial line having excess capacity introduced at various points therein.

In Fig. 6 a series of tracings A, B, C, D and E illustrate the patterns produced when a circuit is set up with a condition of good balance existing between the main and artificial lines and in which a known excess capacity is introduced at various points in the artificial line producing an unbalance. Tracing A shows a condition of good balance in which the tracing appears as a substantially straight line of a tapering character simulating the theoretical illustration of Fig. 3. This condition was then changed by the addition of a small capacity at the remote end of the artificial line, causing the artificial line to draw more current than the real line at the end of the cycle. This produced the pattern form B and corresponds to the supposed theoretical condition illustrated in Fig. 4, in which the inner ends are displaced from the horizontal in what might be termed a clockwise direction. As will be remembered the outer or slender portion of the pair of streaks or images on the pattern represents the near or head end of the line. These are offset somewhat due to the reflex of the unbalance at the end of the cable.

Pattern C is a tracing of the pattern produced when the excess capacity is moved to a point inwardly from the remote end. Here it is seen that the humps or displacements appear back from the inner end of the images at about the points $d$ and $h$ permitting the ends $e$ and $a$ to aline themselves substantially on a horizontal line. This indicates that the signal lines are substantially in balance at the remote end but are unbalanced at a small distance inwardly from the remote end.

The pattern D resulted when the artificial line excess capacity was moved inwardly a step further and placed at a point between its effective center and head end. It will be noted that the inward portions $e$ and $a$ of the tracings remain centered along a substantially horizontal line while the outward portions b and f representing the parts approaching the head end are further displaced but still retain an inward curvature at their outer ends. This indicates that the unbalance instead of being at the head end is some distance therefrom.

The pattern E resulted when the excess of the capacity of the artificial line was moved to a point substantially at the head of the artificial line. In this tracing the inward ends e and a representing the condition of balance at the distant end of the artificial line remain in substantially horizontal alinement. However, the curvature of the tracing at the outer ends b and f is considerably less and does not incline back toward the center indicating that there is a section adjacent the head of the artificial line which is in substantial balance with the real line. It is to be noted that these tracings represent a condition in which there is too much capacity in the artificial line, and that for such a condition the image at the right of the screen pattern which represents the positive half of the signal cycle falls below the horizontal line.

Figure 7:
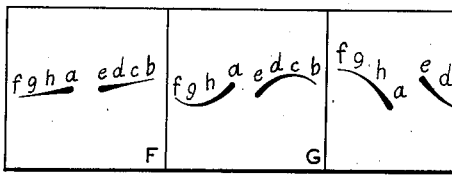
Fig. 7 illustrates patterns produced by an actual artificial line having insufficient capacity at various points therein.

In contrast to the above described condition, Fig. 7 represents tracings of photographs of the cathode-ray screen pattern when capacity is removed from the artificial line, or in other words, a condition in which the artificial line is deficient in capacity at some point.

Referring to tracing F, a small amount of capacity was removed from the front end of the artificial line to produce the tracing shown. It will be noted that the tracing represents a condition substantially opposite that represented by tracing E of Fig. 6. In the tracing F the outer end b of the right image is above the horizontal line rather than below as shown in tracing E. The fact that the images on this tracing have no curvature tends to indicate that the unbalanced condition is immediately at the head end of the artificial line rather than a point removed from the head end.

In the tracing G the capacity removed at the head end of the line was restored and a small capacity removed from the middle of the artificial line. This introduces a curvature in the images near the center thereof. The hump in the right image is above the horizontal line and in the left, of course, below. The tracing H was produced with a condition of insufficient capacity at the end of the artificial line. It will be noted that this is substantially the reverse of tracing B in Fig. 6. The curvature is moved outwardly toward the end of the figures while the inner ends appear somewhat displaced in the opposite direction indicating a similar reflex condition.

It will be noted that the unbalance conditions as illustrated in Fig. 6 represented four steps of change from one end of the artificial line to the other while those illustrated in Fig. 7 represented three steps of change. From a comparison of the tracing images in both figures it will be readily seen that they indicate not only an approximation of the amount of unbalance but also the position and the sense of the unbalance.

Figures 8, 9:
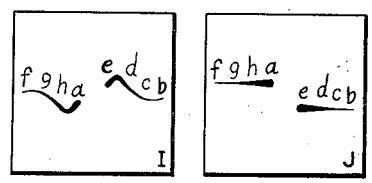
Fig. 8 illustrates a pattern produced by excess capacity near the head end of the artificial line and an insufficient capacity near the opposite end.
Fig. 9 illustrates a pattern produced by an excess of resistance near the head end of the artificial line.

The photograph tracing illustrated in Fig. 8 represents a combination of two opposite conditions of unbalance in the artificial line. In this case there is excess capacity near the head of the artificial line and insufficient capacity at a point approaching the outward end of the same. Referring back to the tracings shown in Figs. 6 and 7, it will readily be seen that the shape of the tracing images are formed as the previously described tracings would indicate. Specifically, the right image has its outer or thin portion b which represents the head of the artificial line, curved or bowed downwardly, which is the direction to be expected for excess capacity, at the head end of the artificial line as indicated by the tracings D and E in Fig. 6. On the other hand the image is formed with an upward hump or curvature adjacent the inner end e, indicating a deficiency of capacity at that point. This portion of the image corresponds to the tracing H, in Fig. 7, except in the latter tracing the deficiency was right at the tail of the artificial line whereas in the present case the deficiency was at a point slightly removed from the tail of the artificial line. A better indication of the formations is probably obtained by referring to tracing C of Fig. 6 in which there is only one condition of unbalance and at a point removed from the tail of the artificial line, and in the opposite sense, that is, a condition of excess capacity rather than a deficiency. It will be seen that the hump near the inner end of the images extends in the opposite direction.

The tracing illustrated in Fig. 9 represents a condition in which the relative propagation of the signal along the real and the artificial line is substantially the same, but at some point adjacent the head of the artificial line there is too much reaction produced by the presence of an excess amount of resistance. Such a condition causes a vertical displacement of the images on a screen as shown in the tracing. It will be noted that the shapes of the images are substantially straight or horizontal and in this respect the images are quite similar to those illustrated in tracing A, Fig. 6. The difference between the tracings is evident as a vertical displacement.

Another form of this invention which gives a different graph pattern is illustrated in Fig. 10. It operates on somewhat different principles from the embodiment just described, differing primarily in the sweep circuit, the control potentials for which are not produced by the signals themselves, but by separate means timed and phased in accordance with the signals. Preferably the arrangement is such that the pattern upon the cathode-ray tube screen is extended the full width of the light spot or electron beam's sweep for each half of the signal cycle, thus enabling the deflections or humps in the pattern to be outlined in greater detail. While more apparatus is required in accordance with the embodiment now to be described, the interpolation of the unbalanced conditions in terms of artificial line adjustment is greatly facilitated and the symmetrical pattern formed in the screen has other advantages as will be pointed out.

The illustration in Fig. 10 shows the apparatus in greater detail than the illustration employed in connection with the previously described embodiment. Appropriate parts of the apparatus here described such as the amplifier, may be incorporated in the previous embodiment. One side of the duplex network embodies a real line or cable 30 which may be any type of duplexed land line circuit or any type of duplexed cable circuit, either long or short, loaded or unloaded, or the combined type of cable, several of which have been laid in late years, comprising a loaded central section and non-loaded end sections. The other side of the duplex network comprises a suitable artificial line or cable 31 capable of adjustment. The cable and artificial line are connected through a network 32. The unbalance voltages are impressed upon the cathode-ray tube 33 through an amplifier 34. A commutator device 35 is employed for coordinating the generation of test signals and sweep circuit potentials.

The commutator is illustrated in developed form. It comprises three rings 36, 37 and 38, swept by a brush arm 39 having separate brushes 41, 42 and 43 corresponding respectively to the rings 36, 37 and 38 and each insulated from the others. The brush 41 sweeping the commutator ring 36 is connected through conductor 44 to the duplex network 32 for impressing the test signals thereon. The brushes 42 and 43 are connected to conductor 45 providing one side of a short-circuiting arrangement, the function of which will presently be described.

The ring 36 is divided into an even number of segments. In the illustration it comprises four segments, 46, 47, 48 and 49. Alternate segments are connected to sources of opposite potential. Segments 46 and 48 are connected through a common lead to the plus side of a battery 51. Segments 47 and 49 are similarly connected through a common lead to the minus side of battery 51. The midpoint of the battery 51 is connected to ground. By this means when brush 41 sweeps the ring 36, the potentials impressed upon the circuit exist for a predetermined length of time and are then reversed. The frequency of these potentials is determined by the speed with which the brush is driven. As is well understood, a complete signal cycle will have been completed when two complete consecutive segments of the ring have been passed over by the brush.

The other two rings 37 and 38 of the commutator embody short segments which when engaged by the brushes 42 and 43 provide a short-circuiting means for the sweep circuit of the tube 33 as will presently be described. The ring 37 embodies a first segment 52 and a second segment 53 at an intermediate position, both of which are disposed to be engaged by the brush 42 simultaneously with the connecting of the positive battery with the line through segments 46 and 48 of ring 36. The ring 38 embodies alternately arranged segments 54 and 55 disposed in similar alinement with the front ends of segments 47 and 49 so as to be contacted by brush 43 simultaneously with the connecting of negative battery through the brush 41 to the line. As will be seen, this arrangement provides a short segment of contacting material separated by insulating material disposed in alinement with the segments of ring 36 at the beginning of each current reversal so that as the current reversal occurs, the circuit through these segments is completed. The segments 52 and 53 are connected through a common lead 56 and a switch 57 to a lead 58 from the sweep circuit, presently to be described, which is shorted through the action of these segments. Segments 54 and 55 are connected through common lead 59 and switch 61 to the same sweep circuit lead 58 as the segments 52 and 53. The switches 57 and 61 provide means for cutting off the action of either pair of segments which, as the description will show, provide means for cutting out either half of the pattern corresponding to either the positive or negative portion of the signal cycle.

The network 32 is of the bridge duplex type ordinarily employed for ocean cable circuits and comprises ratio arms 62 and 63, including capacitors, as the dividing reactors. The arms are joined at a common point 64 and connected through inductance 65 and conductor 44 to the current reversal brush 41 of the test signal distributor. The real line or cable 30 and the artificial line 31 comprise the other arms of the bridge and are joined respectively to the ratio arms at the conjugate points X and Y across which the receiving apparatus is connected. The apparatus employed for testing according to this invention may be used in connection with any of the usual types of receivers and may be connected across any two points in the receiving circuit across which it is desired that no unbalanced potentials occur. The arrangement of receiving apparatus shown is merely illustrative and comprises a series receiving capacitor 66 and a receiver coil 67. The receiving coil may be shunted if desired by means such as inductance 68 in series with a resistance 69.

The form of artificial line 31 does not form a part of this invention. It is to be understood that any type of artificial line may be employed which provides for adjustment of the various elements constituting the line. A conventional type of artificial line is illustrated comprising several resistances 71 arranged in series with inductances 72 arranged to simulate the resistance and inductance of the real line. The capacitance of the real line is simulated by connecting a suitable number of capacitors 73 from suitable points in the resistance-inductance series to ground.

With regard to the amplifier 34 connected be-between the receiver and the cathode ray tube 33, the major considerations are that it shall have substantially straight-line amplification characteristics for a wide range of frequencies extending down to substantially zero and also introduce the minimum disturbance into the receiving circuit. The latter of these conditions is largely met, for example, by employing a so-called self-contained amplifier enclosed within a shielded compartment having no ground connections. By this means the capacity of the amplifier to ground is made negligible, reducing the error which may be thus introduced. A self-contained amplifier is one employing batteries within the shielded compartment for providing the necessary potentials, thus avoiding any direct or inductive circuit path through the amplifier to ground. Special attention is also given to these features in the cathode ray tube and its power supply, as will be presently described. An amplifier having substantially flat amplification characteristics is secured by employing direct coupling between the various stages within the amplifier.

The amplifier shown by way of example comprises a pair of electron tubes 74 and 75 direct coupled in cascade. The input to the amplifier is obtained from a potentiometer 76 connected across the receiving coil 67. In accordance with the purposes of this invention, as already stated, the potentiometer 76 may be connected across any portion of the receiving circuit where it is desired to determine or eliminate unbalance potentials. The amplifier is fed through the input grid of the first tube 74, which is connected to the arm of the potentiometer 76. The anode of the tube 74 is connected by means of a suitable conductor directly to the input grid of the second tube 75. Operating current at a suitable potential is provided for both the anode of the first tube and the grid of the second tube, through a resistor 77. The current to the anode of the second tube is supplied through a resistor 78. The connection of the amplifier to the cathode ray tube is provided through coupling or blocking condensers 79 and 81.

The proper current potentials for the various elements of the amplifying tubes are supplied as illustrated in the drawings from a common battery 82 having a suitable total voltage by tapping the battery at suitable points intermediate its plus and minus ends. Negative bias for the grid of the input tube 74 is preferably supplied by battery 83 having a potentiometer bridge across a portion thereof for suitably adjusting the bias. By employing a battery instead of a voltage divider supplied with potential by separate source, the possibility of feed back or regeneration which would alter the frequency characteristic of the amplifier is avoided. It will be understood by those skilled in the art that suitable by-pass condensers are employed to provide individual shunt circuit paths for various portions of the amplifier where needed. A potentiometer 84 which is connected to the amplifier side of coupling condenser or capacitor 81 is provided to adjust the potential upon that condenser to substantially equal that impressed upon the condenser 79. In other words, by means of a potentiometer 84, compensation can be made for the average drop in potential across the resistance 78 due to the current drawn by the output tube 75.

In the preferred form of the invention the power supply for the cathode ray tube 33 is specially designed to minimize the capacity to ground through the apparatus to eliminate, as in connection with the amplifier, any disturbances in the signal circuit from that source. In order to provide for the high potentials required for a cathode ray tube, it is desirable to supply the operating potentials from a step-up transformer 87 operating through a suitable tube rectifier 88. Without taking special precautions, considerable capacitance would be introduced through the transformer 87. This is avoided by supplying the current to the primary of the transformer from a motor-generator arrangement including a motor 89 supplied from power leads and a generator 91 which is driven by the motor but is electrically insulated therefrom and arranged so that the electrostatic capacity between the motor and generator is negligible.

The cathode ray tube 33 has current supplied at the proper potential for its various elements from the rectifier 88 by the use of a voltage divider 92 comprising a series of resistance elements 93, 94, 95, 96 and 97. The cathode and several grids of the cathode ray tube 86 are arranged in a conventional manner and connected to the voltage divider either by taps or a potentiometer to supply the proper potentials. The sweep circuit arrangement to be described includes a variable resistance 98 tapped between the voltage divider elements 95 and 96. The cathode ray tube is of a conventional type and is preferably provided with a special retentive screen by means of which the patterns developed upon the screen will be retained for a considerable period, such for example as that described in the above-mentioned Du Mont patent.

The cathode ray tube is provided with quadrant plates 101, 102, 103 and 104 for controlling the deflection of the electron beam in a well known manner. The plates 101 and 103 comprise the side to side plates and are employed to produce what is known as the sweep movement of the electron beam. Plates 102 and 104 are the up and down plates and produce the deflections of the beam from the normal axis to form the pattern. In the drawings, the cathode ray tube is shown diagrammatically and the actual relationship of the plates 101, 102, 103 and 104 is not shown.

The sweep of the electron beam is not produced by the signal as in the embodiment of Fig. 1 but is produced concurrently with the signal by the control provided through the commutator 35. The plate 103 is preferably connected back from the positive end of the voltage divider midway between the positive end and the point where the variable resistance 98 is tapped. The opposite plate 101 is normally connected through the variable resistance and thence to a still lower point on the voltage divider as already indicated. The sweep is produced by what is known as the variable condenser-resistance method by which the relative potential between plates 101 and 103 is changed from that at the extreme positive end of the voltage divider to that at the point between resistance elements 95 and 96 where the plate is normally connected through the resistance 98 to the voltage divider.

The action of the combined condenser-resistor arrangement, such as illustrated, for producing sweep, is well known in the art. However, according to this invention, a special type of control mechanism as already described in connection with commutator 35 is provided for coordinating the action of the sweep circuit with the signals. The sweep circuit comprises the variable resistance 98 tapped, as already stated, at a point on the voltage divider having a lower potential than plate 103, and a variable condenser 105. The condenser 105 is connected in the sweep circuit with one side to the plate 101, and the other side to the positive end of the voltage divider 92. The special control provides means for periodically short-circuiting condenser 105 in synchronism with the test signals.

It will be seen that immediately upon the short-circuit being established plate 101 will assume the potential of the positive or high end of the voltage divider 92. When the short-circuit is removed, the condenser 105 will begin to charge through the resistance 98, due to the fact that the opposite electrodes of the condenser are then connected to points along the voltage divider at different potentials. As the condenser 105 charges at a rate determined by the capacity of the condenser and the value of the resistance 98, the plate 101 tends to assume the potential of the point along the voltage divider at which the lead through the resistance 98 is tapped. Since the point just mentioned, which determines the potential of plate 101, when the condenser has become fully charged, is at a potential lower than plate 103, and the positive end of the voltage divider, which determines the potential of plate 101 upon short-circuit of the sweep condenser, it will be seen that voltage of plate 101 swings from a value higher than the opposite plate 103 to a value lower than the latter. This will cause the electron beam of the cathode ray tube to be deflected from a position adjacent plate 101 through the center or normal position to a position adjacent plate 103.

A vacuum tube operating at saturation or a pentode tube may be substituted for the variable resistor 98 and produce a sweep which will be more nearly linear with time than that obtained with a simple resistor as shown.

The vertical plates 102 and 104 derive their normal potential from the positive end of the voltage divider through a common resistor 106 and individual resistors 107 and 108. The up and down potentials are impressed upon the plates from the amplifier 34 through the coupling condensers 79 and 81. The connection from the plates 102 and 104 is direct to these condensers, so that the potentials transmitted by the latter are impressed directly upon the plates. The resistors 106, 107 and 108 are made relatively large and the values of the condensers 79 and 81 also relatively large, so that the condensers tend to equalize very slowly when impulses of slow frequency are impressed thereon.

This provides an arrangement to which the up and down plates respond virtually as if they were free or floating. At the same time the leakage through the resistors 107 and 108 tends to maintain them at the same potential at no load, and the leakage through the resistor 106 to the voltage divider tends to maintain them at the desired elevated potential with respect to the other electrodes of the cathode ray tube.

In order to more fully explain how the devices just described and illustrated in Fig. 10 cooperate to produce a screen pattern which will indicate the condition of the balance obtaining between the real and artificial lines, the operation of the various parts when test signals are applied will now be described. In order for a substantially stationary pattern to appear upon the screen of the cathode ray tube, a control of the sweep circuit must be provided. In this embodiment of the invention means is provided for causing complete traverse of the electron stream, or the light spot upon the screen, for each half cycle of the signals impressed upon the duplex circuit. Particular attention is drawn to what is accomplished by such a coordination of the sweep circuits with the signals. As is well recognized, the propagation of each signal along a transmission line requires an appreciable and measurable time period. If a control of the sweep circuit of the cathode ray tube is provided to coordinate its action with the origination of the signals, so that the pattern forming a portion of the spot travel is started at a certain point in each signal cycle or half cycle, and progresses across the screen in the usual manner at a steady rate, the movement of this light spot provides a scale of measurement for the propagation of the signals during each cycle. In other words, if the light spot is swept across the screen for each reversal of the signal current, elemental lengths of the path of the light correspond to different portions of a curve representing the flow of current into the line for each portion of the signal cycle, and by comparison may be identified with certain portions. As is well known to those skilled in the art, the propagation of signals along a line may be analyzed or determined from the shape of the signal current curve. Therefore, the time-current graph or screen pattern produced by a traverse of the light spot for each half cycle of a signal, or as will later appear, for a certain portion of each half cycle, provides a pattern which will be indicative of the conditions obtaining at any and all instants within that portion of the cycle.

In order to further illustrate, it will be desirable to follow through the origin and propagation of a full current reversal or signal cycle and the coordination of the sweep circuit thereto. As will be seen, the alternate segments of the ring 36 of the commutator 35 are connected to opposite polarities, the segment 46 being coupled to the positive side of the battery 51, and the segment 47 to the negative side of battery 51. Therefore, when the brush 41 sweeps the commutator, the head of the duplex circuit will be connected through conductor 44 first to positive and then to negative battery. The frequency of the signals, or the speed of the reversals, may be made any desired value by adjusting the speed of the brush arm 39. Assuming that the brush begins to rotate as soon as the bridge 32 is connected to positive battery, a current charge quickly divided between arms 62 and 63, rushes into the real line 30 and the artificial line 31. The capacities near the head of the respective lines take up a considerable amount of current rapidly. However, capacities away from the head of the real and artificial lines take up current more slowly, so that a signal wave is propagated along the lines at a rate determined by the line reactances. As is well understood, these reactances may be comprised of capacitance, which in ocean cables is the primary factor, and resistance or inductance. In a duplex circuit, the artificial line is intended to simulate these values throughout the length of the real line. When discrepancies between the reactance values of the real and artificial lines are present, an unbalance exists, and in accordance with the operation of duplexed circuits, the signal current will not be equally divided between the real and artificial lines, and a flow of current across the receiving devices will occur.

As the commutator started to rotate brush 42 engaged segment 52, which is connected to the lead 58 extending from one side of the sweep control circuit. The brush 42 being connected with lead 45 from the other side of the sweep control circuit, the circuit is closed momentarily and the condenser 105 is short-circuited by the passage of the brush section over the commutator segment 52. The width of the segment 52 is made small so that the circuit is closed only momentarily. This, however, discharges the condenser 105 and causes the deflector plate 101 of the cathode ray tube to assume the voltage at the positive end of the voltage divider 92. This suddenly brings the light spot on the screen to the extreme left position.

Segment 54 on the commutator also connected to the lead 58 is so positioned that the brush 43, also connected to lead 45, closes the sweep circuit by contacting the segment just at the time that the reverse current through the segment 47 is impressed upon the signal circuit. The other two segments 53 and 55 perform the same functions with respect to the signal reversals occurring as the current from the segments 48 and 49 is impressed upon the signal circuit.

As the brush 42 leaves the segment 52, the sweep control circuit is again opened and the charging of condenser 105 through resistance 98 moves the spot to the right relatively slowly, at a speed determined by the adjustments and values of the capacity 105 and resistance 98. The range of the values and adjustments are preferably such that the spot of light can be made to travel across the screen within a time approximately equal to the full period of each half cycle of the signal or within a shorter time period when it is desired. When the spot is adjusted to travel at a shorter time period, it means that the pattern represents not the entire half cycle of the signal but some predetermined portion thereof.

With the sweep circuit control segments 52, 53, 54 and 55 in the position shown with respect to the signal segments 46, 47, 48 and 49, the light spot will be brought to a starting point at the beginning of each signal reversal. If it is made to travel across the screen within a period which represents a fraction of each signal half cycle, it will mean that the pattern will represent the portion of the signal cycle first impressed upon the line and will be a picture of the unbalanced condition existing in the portion of the real and artificial lines which the signal first penetrates; or in other words, the near or the head ends of the respective lines. Therefore, by this means the screen pattern may be made to give an enlarged picture of the unbalance currents in a desired fractional portion of the line extending out from the head end.

The double pointed arrow placed near the commutator ring 36 is intended to indicate that this ring may be adjusted rotationally with respect to rings 37 and 38 carrying the sweep circuit control segments. By means of adjustment of ring 36 such that the sweep circuit control of short-circuiting segments are positioned at points later in the half cycle current reversal periods and enlargement of the unbalanced conditions of any section of the artificial and real lines may be pictured. By suitably continuing the adjustments, the entire extent of the signal circuits and the relation between the real and the artificial lines may be explored in sections.

As has already been pointed out in connection with the previous embodiment, the portions of the pattern representing the opposite half-cycles of signal current propagation are represented by similar deflections in opposite directions from a zero axis. As will be presently pointed out in connection with tracings of actual screen patterns produced by the embodiment of this invention shown in Fig. 10, the switches 57 and 61 in the sweep circuit control leads and the corresponding commutator arrangement permit the portion of the pattern resulting from either the positive or negative half of the signal cycle to be produced separately.

To interpret the meaning of the screen patterns and the manner in which they are employed in a method of rapidly balancing duplex circuits of every kind including particularly long ocean cables, tracings of a number of typical patterns are illustrated in the drawings in Figs. 11 to 15. Certain of these tracings are produced by a known set of conditions and by this means a system of reading or interpreting the tracings is developed.

Referring now to Fig. 11, which includes several tracings produced by a series of known conditions, tracing K is of a screen pattern produced by the insertion of excess capacity at the head of the artificial line. It will be noted that there is a deflection of the beam above and below the horizontal axis immediately at the beginning of the light spot sweep. Tracing L represents a pattern produced when this capacity is moved a short distance back from the head of the artificial line. Tracings M, N and O represent the conditions when the excess capacity is progressively moved farther out on the artificial line. The relative positions of the humps of the pattern for excess capacity occurring at different distances in the artificial line, will not be the same for all artificial lines. The positions of the excess capacity can be fairly accurately determined and calculated, however, by close measurements of the patterns with a test excess capacity placed at evenly spaced distances, beginning at the head of the artificial line and continuing to the extreme outer end thereof. Thus it will be apparent that by employing the method and apparatus of the invention as herein described, a quick and accurate determination of the position in artificial line where the inequalities lie may be made. As will be pointed out, the shape of the unbalance pattern further artificial line so that the necessary correction may be made, and by employing sufficient amplification, the balancing may be carried out to any desired degree of refinement.

Referring to Fig. 12, tracing P shows a pattern in which there is a capacity unbalance at two points in the artificial line. This tracing shows a pronounced deflection adjacent the head of the artificial line and a similar deflection at a point back from the head of the line.

The tracing Q represents one half of the pattern shown by the tracing P and is obtained by opening one of the switches 57 or 61 which limits the sweep of the cathode beam to only one of the half cycles. By a test placement of a capacity in the artificial line with one half of the cycle represented in the pattern it is easy to determine the direction of the deflections representing an excess of capacity in the artificial line. Assuming that an upward deflection in tracing Q represents an excess, it will be seen that there is too much capacity adjacent the head of the artificial line and too little capacity at a point back from the head end.

By utilizing the method of operation illustrated in the tracing Q, the position and direction of any unbalance in the artificial line may be easily ascertained. By combining both halves of the pattern as shown in tracing P as well as the previous tracings illustrated in Fig. 11, slight amounts of unbalance can be more easily distinguished because of the fact that the two halves of the tracing separate from each other by a distance double the amount of the deflection. This advantage will be most appreciated in making the final adjustments which are usually of very small quantities as the refinement of the balance proceeds.

Fig. 13 illustrates tracings produced when the unbalance is primarily in the nature of unequal resistance in the artificial and real lines. It will be seen that the tracings R and S are composed of two parts which cross each other and are separated and in substantially parallelism adjacent the remote end. The portion of the artificial line in which the resistance unbalance occurs will be found to correspond with the point at which these tracings cross each other on the zero axis. The amount of resistance unbalance will correspond substantially to the amount of separation of the parallel portion of the tracings.

When there is a resistance unbalance there may also be present capacity or inductive unbalance as well. The tracing T represents such a condition. In order to establish a balance the best procedure would be to eliminate the capacity unbalance by adjusting the portion of the artificial line corresponding in this instance to the two nodes on the pattern adjacent the head of the line. After this unbalance has been cleared up, the patterns will cross each other as shown in R and S and the point of the resistive unbalance can be located.

Figure 14:
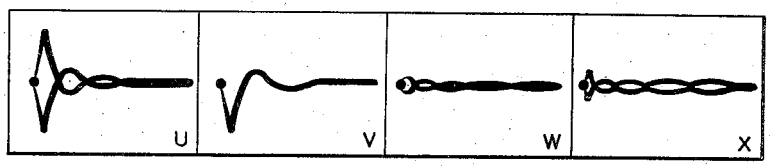
Figs. 14 and 15 illustrate other patterns resulting from unbalance and disturbances in the line or cable.

In Fig. 14 is illustrated a series of tracings of actual patterns or graphs obtained while balancing an ocean cable in actual service by the method and apparatus described above. First, the pattern U was obtained which indicated at least three points of capacity unbalance. The sense and direction of these was established by cutting out one half of the pattern which gave the tracing V and following the analysis just explained in connection with tracing Q of Fig. 12, the tracing V indicates a deficiency of capacity adjacent the head of the artificial line and too great a capacity at a point slightly removed from the head with a second point of deficiency a little further along. After making a small number of adjustments in comparison with the adjustments ordinarily required to greatly improve the balance of a cable, the tracing W was obtained.

The tracings U, V and W were obtained with a circuit arrangement substantially as shown in Fig. 10 in which the amplifier employed between the cathode ray tube and the circuit across which it was desired to establish a balanced condition was adjusted to a low value in order to bring the unbalance pattern within the confines of the screen of the cathode ray tube. After the adjustments had been made and the tracing W obtained, the amplification was increased which resulted in the tracing X. It will be noted by comparing tracing X with W that the wide portions of the tracing W have now become sepaarted into half cycle pattern portions in X. With the amplified pattern as a guide, the refinement of the cable balance was continued to a point that had never been approached heretofore.

The method of balancing according to the invention has the further advantage, when utilized in connection with signalling circuits or cables subject to outside interference, that the disturbances or parasitic currents thus produced in the circuit may be recognized and eliminated from consideration. In the past, the presence of such currents greatly complicated the balancing operation, particularly in ocean cables of great length where the parasitic currents are large compared with the signalling currents.

Figure 15:
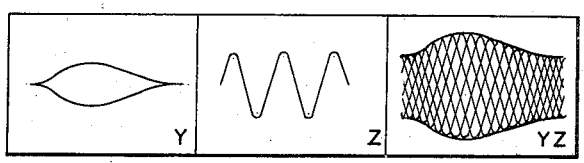

This feature of the invention may be explained in connection with Fig. 15, in which tracing Y represents a symmetrical unbalance pattern obtained with the apparatus of Fig. 10 with no interference on the circuit. If a parasitic current, such as indicated in tracing Z is flowing through the signalling circuit, the pattern obtained will be of the form shown in the tracing YZ. The envelope of the pattern has the same form as the pattern Y and thus the character and amount of unbalance is still evident even through the interference current is of greater amplitude than the unbalance current. If as is usually the case, the interference current is not periodic, as shown in tracing Z, but merely consists of intermittent spaced impulses, it causes an unsymmetrical distortion of the unbalance pattern and thus may be readily recognized since the unbalance is always represented by a symmetrical pattern.

In actual practice it may be desirable to observe or correct the balance on a signalling circuit while it is in use, the transmitting current impulses being utilized instead of applying testing current to the circuit as described in connection with the embodiments shown in Figs. 1 and 10. Reception from the remote end of the circuit must, of course, be discontinued during this operation.

Figure 16:
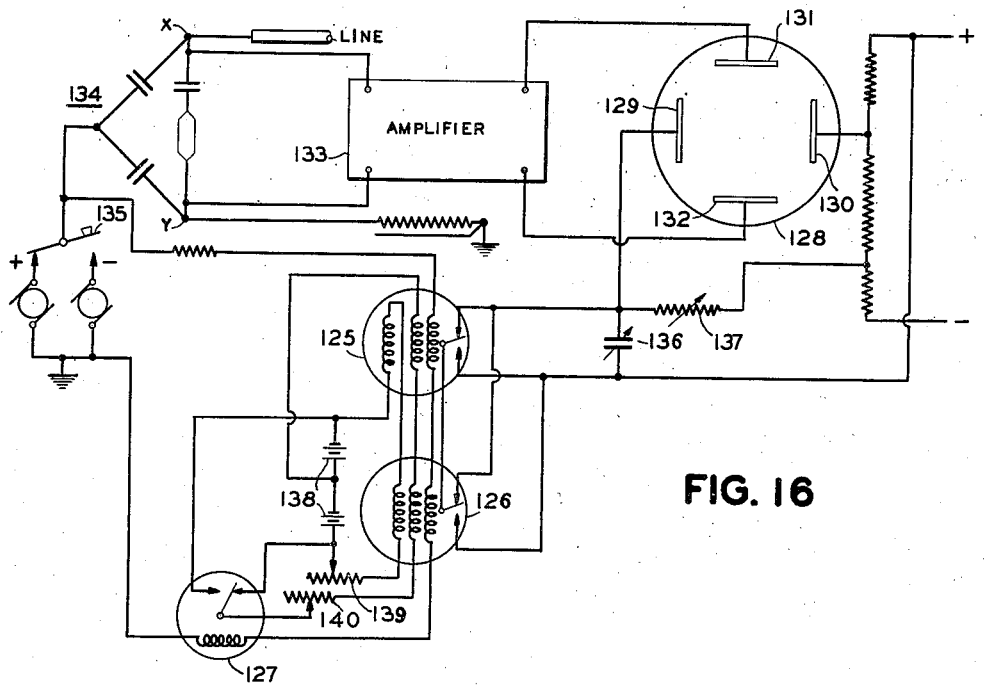
Fig. 16 is a circuit diagram of a modified system arranged to indicate unbalance while the line or cable is in use and printing or other signals are being transmitted thereover.

The apparatus may consist of relays arranged to control the sweep of the light spot in the cathode ray tube in such a manner that the spot is returned to its starting position jus before each reversal of the cable. Then during the signal impulse the unbalance pattern is traced as described above. Fig. 16 illustrates by way of example control relays 125, 126 and 127 of the polarized type arranged to control the sweep circuit of a cathode ray tube 128 provided with pairs of control electrodes 129, 130 and 131, 132. The connection of amplifier 133 and cathode ray tube 128 to the duplex circuit 134 of the bridge type is the same as that shown in Fig. 10 and already described in detail. The usual transmitting key is indicated at 135. From the foregoing description of the embodiment shown in Fig. 10, it will be evident that unbalance patterns of the type illustrated in Figs. 11–15 will be formed by the tube 128 if the sweep circuit condenser 136 is short-circuited in properly timed relation to the reversals in the cable effected by the key 135. The condenser 136 is charged from the supply circuit of the cathode ray tube through the variable resistor 137 corresponding to the resistor 98 of Fig. 10.

The main line windings of the polar relays 125, 126 and 127 are connected in series relation across the key 135 so that the current traversing these windings is reversed each time the key is operated. Since the armatures of relays 125 and 126 are connected together and the front and back contacts, respectively, of each of these relays are connected in parallel and to opposite sides of the condenser 136, it will be apparent that a momentary short-circuit will be placed across the condenser if the relays operate at different speeds, i. e., if the armature of one relay engages its lower contact before the armature of the other relay disengages its upper contact or vice versa.

In order to effect this result, a biasing current derived from a battery 138 is applied to the left-hand accelerating windings of relays 125 and 126, the windings being connected in opposite series relation. The strength of the biasing current and hence the duration of the short-circuit across the condenser 136 may be adjusted by resistor 139.

The short-circuit of the sweep circuit condenser 136 should take place at the beginning of the cable reversal. The relay 127 is provided to control the timing of the short-circuiting operation and, in order to accomplish this result, it is arranged to send a biasing current through the central or opposing windings of relays 125 and 126. The contacts of relay 127 are connected to opposite ends of battery 138 and the opposing windings of relays 125 and 126 are connected to the armature of relay 127 and a midpoint tap on the battery 138 so that the biasing current is reversed upon each operation of relay 127. The circuit of the opposing windings of the relays includes a variable resistor 140 which controls the timing of the short-circuit of condenser 136 with respect to the cable reversals and hence the instant when the cathode ray beam is returned to its starting position to commence another trace. By proper adjustment, the shunting of the condenser may be caused to take place before the sending-on relays operate and before zero current is reached in the cable.

In this manner a momentary contact is obtained in timed relation to the cable reversals for controlling the sweep circuit of the cathode ray tube. Therefore, the apparatus for indicating unbalance may be used on a cable transmitting printer or other signals for checking balance while the cable is in use.

Many other modifications will occur to those skilled in the art and may be made without departing from the scope of the invention which involves a radical departure from the prior practice. Heretofore balancing of lines, particularly long cables where an extremely accurate balance is desirable, has been a tedious, cut-and-try procedure requiring experienced highly skilled workers. The method and apparatus embodying the invention on the other hand lead to improved results which are obtained more easily and expeditiously. The balance may be refined to any extent desired and the effect of any balancing adjustment is immediately made apparent. The apparatus is so sensitive that the effects of obscure unbalances caused by the characteristics of terminal equipment or other causes can be discovered and compensated. In general a better balance can be secured and maintained which is of the utmost importance, for example, in long cable circuits since higher speeds of transmission may be employed, thereby increasing the line capacity without substantially affecting the plant equipment or operating expense. Many other instances might be cited to show the utility and value of the invention in particular applications.

I claim:

1. The method of balancing a circuit and an artificial line which consists in impressing cyclic current impulses on said circuit and artificial line, forming a time-current graph or pattern of at least a portion of the unbalance current during each impulse and making successive balancing adjustments in the artificial line concurrently with observations of the resultant changes in the graph or pattern to reduce the magnitude of the unbalance between the circuit and the artificial line.

2. The method of analyzing unbalanced conditions in a duplex circuit which consists in impressing cyclic current impulses on the real and artificial lines thereof and forming a time-current visible pattern of at least a portion of each impulse of a character representing the relation between the current propagation in the real and artificial lines in which differences in current appear as displacements from a reference axis of the pattern.

3. The method of comparing circuits or other electrical elements which comprises subjecting the same to an electrical potential, balancing the currents flowing during an appreciable time interval and representing the difference or unbalance current at successive instants during said time interval in a form in which the magnitude, time and direction of any portion of such unbalance current may be observed.

4. The method of comparing circuits or other electrical elements which comprises subjecting the same to cyclic current impulses, balancing the currents flowing to each element and forming a sustained visible time-current graph or pattern of the unbalance current flowing during each cycle.

5. The method of balancing a circuit which comprises superimposing a visible time-current graph or pattern of the unbalance current after making a balancing adjustment upon the graph or pattern corresponding to the unbalance current before such adjustment.

6. The method of balancing a circuit which comprises subjecting said circuit to periodic current impulses and forming a symmetrical time-current pattern of the unbalance current whereby the parasitic currents flowing through the circuit and forming an unsymmetrical pattern may be segregated from the unbalance current in analyzing the pattern.

7. The method of balancing a circuit subject to either periodic or aperiodic interference which comprises subjecting said circuit to potential to cause a current wave propagation through the circuit and forming a time-current pattern of the unbalance and interference current in such form that the unbalance may be segregated from the periodic or aperiodic interference.

8. The method of balancing a duplex circuit which comprises forming a graphic pattern of the cyclic unbalance current in which the unbalance is indicated as deflections from a zero axis, making as may be indicated by concurrently observing the changes in the pattern such successive balancing adjustments in the artificial line as tend to cause the deflection lines of the pattern to approach the zero axis, and at a plurality of stages in the procedure amplifying by successively greater amounts the deflections as the balance is refined.

9. The combination of a duplex circuit having a real line and an artificial line, and means including a cathode ray tube for forming a significant time-current pattern continually indicating the condition of balance between said real line and artificial line whereby the effect of balancing adjustments of the circuit become immediately apparent.

10. The combination of a duplex circuit having a real line and an artificial line, a cathode ray tube of the fluorescent screen type provided with control elements, connections between said control elements and said circuit, means to provide a sweep circuit for the tube for causing a sweep of the cathode ray beam along an axis and for synchronizing the same with the out signals impressed upon said duplex circuit, and means to provide for the impression of voltages corresponding to the unbalance between said real and artificial lines upon said cathode ray tube in such a manner as to cause deflections from the said axis by the cathode ray beam whereby a pattern of the unbalanced voltages is provided.

11. The combination with a line conductor and an artificial line, of luminescent means for forming a sustained visible pattern representing the character of the unbalance between said conductor and said artificial line.

12. The combination with a line conductor and an artificial line, of electro-responsive means for forming a visible pattern representing the character of the unbalance between said conductor and said artificial line and for superimposing thereon a visible pattern representing the character of the unbalance after a balancing adjustment has been made.

13. The combination with a line conductor and an artificial line, of means for propagating current waves over said line conductor and said artificial line and means including a cathode ray tube for indicating the relation between the current flow in said conductor and that in said artificial line in a form in which the parasitic currents to which said conductor may be subject may be distinguished from the unbalance current.

14. The combination with a line conductor and an artificial line, of means for propagating current waves over said line conductor and said artificial line and means including a cathode ray tube for indicating the time-current relation between the current waves in said line conductor and said artificial line, respectively.

15. The combination with a line conductor and an artificial line, of means to apply current impulses to said conductor and said artificial line, and means including a cathode ray tube for indicating unbalance between said conductor and said artificial line, said last-mentioned means further comprising a sweep circuit for said tube and means for energizing the same in synchronism with said current impulses.

16. The combination with a line conductor and an artificial line, of commutator means to apply successive current impulses to said conductor and said artificial line and means including a cathode ray tube responsive to said impulses for indicating unbalance between said conductor and said artificial line, said tube being provided with a sweep circuit connected to said commutator means to be energized in synchronism with said current impulses.

17. The combination with a line conductor and an artificial line, of transmitting equipment for signaling over said conductor and means including a cathode ray tube responsive to signaling impulses for indicating unbalance between said conductor and said artificial line while the conductor is in use, said means further comprising a sweep circuit for said tube and relay means for conditioning said sweep circuit in timed relation to said signaling impulses.

18. The combination with a line conductor and an artificial line, of a cathode ray tube unbalance indicator having control elements connected to said line conductor and artificial line and an adjustable-gain amplifier interposed between said conductor and said unbalance indicator.

19. The combination with a line conductor and an artificial line, of means for applying cyclic current thereto and means for forming a pattern representing the character of the unbalance between said conductor and said artificial line, said last-mentioned means including a cathode ray tube provided with a luminescent screen and means for sweeping all or a part of each cycle of current over the entire width of the screen of said tube.

20. The combination with a line conductor and an artificial line, of means for applying current impulses thereto and means for forming a pattern representing the character of the unbalance between said conductor and said artificial line, said last-mentioned means including a cathode ray tube and means to sweep the cathode ray beam of the tube in timed relation to said impulses and at a non-uniform rate depending upon the rate of propagation of the impulses in said line conductor and artificial line.

21. The combination with a line conductor and an artificial line, of means for applying current impulses thereto and means for forming a pattern representing the character of the unbalance between said conductor and said artificial line, said last-mentioned means including a cathode ray tube and means for producing a sweep of the cathode ray beam of the tube at a uniform rate independent of the rate of propagation of the current impulses in said line conductor and artificial line.

22. The combination with a line conductor and an artificial line, of means for forming a pattern representing the character of the unbalance between said conductor and said artificial line, said means including a cathode ray tube, means for deflecting the cathode ray beam of said tube along the coordinates of the screen and means for enlarging the amplitude of the deflection of the beam along either or both of said coordinates.

23. The combination with an electrical circuit having variable electrical constants and means for impressing signalling current thereon, of means comprising a cathode ray tube connected to said circuit for providing a visual indication of any departure from optimum adjustments of said circuit in response to the flow of current therein.

24. The combination with signal receiving apparatus including an electrical circuit, an electrical constant of which is variable, of means comprising a cathode ray tube for indicating the required adjustment of said circuit for optimum receiving conditions.

25. The combination with a line conductor and an artificial line having distributed capacity and resistance approximately balancing those of the line conductor, of electrical means for indicating the approximate location of unbalance between said conductor and said artificial line.

26. The combination with a line conductor and an artificial line, of means for propagating current waves over said line conductor and artificial line, and means including a cathode ray tube of the highly retentive fluorescent screen type for indicating the time-current relation between the current waves in said line conductor and artificial line, respectively.

27. The combination with a duplex circuit of the bridge type, of receiving means including a line coil and a cathode ray tube having sweep plates connected across the line coil and deflection plates connected across conjugate points of the bridge.

28. The combination with a duplex circuit of a cathode ray tube provided with a sweep circuit and an unbalance deflection circuit, connections between said deflection circuit and said duplex circuit, and means for timing or conditioning current flow in said sweep and unbalance deflection circuits.

29. The combination wtih a line conductor and an artificial line, of means for applying positive and negative signals thereto and means for observing the unbalance between said conductor and said artificial line in response to only the positive signals or only the negative signals as desired.

30. The combination with a line conductor and an artificial line, of means for forming a visible pattern representing the character of the unbalance between said conductor and said artificial line, said means comprising a cathode ray tube having a screen and control means to sweep the cathode ray beam with alternate half cycles of signalling current represented on opposite sides of an axis transverse to the line of sweep on the tube screen.

31. The combination with a line conductor and an artificial line, of means for forming a visible pattern representing the character of the unbalance between said conductor and said artificial line, said means including a cathode ray tube having a screen and means for sweeping the cathode ray beam from one side of the screen to the opposite side for each half cycle of signalling current with positive and negative signals symmetrically arranged with respect to the sweep axis on said screen.

32. The combination with a line conductor and an artificial line, of means for forming a visible pattern representing the character of the unbalance between said conductor and said artificial line, said means including a cathode ray tube having a screen and a shielded self-contained ungrounded straight-line amplifier interposed between said tube and the conjugate points of said line conductor and artificial line.

33. The combination with a line conductor and an artificial line, of means for forming a visible pattern representing the character of the unbalance between said conductor and said artificial line, said means including a cathode ray tube having a screen and means for producing a sweep of the cathode ray beam of said tube in response to each successive signal applied to the line conductor and artificial line.

34. In an electrical communication system, means for transmitting signalling variations, receiving means for said variations including an adjustable receiving circuit containing inductance and capacity and means including a cathode ray tube connected to said receiving means in a manner to be affected by the characteristics of said receiving circuit to facilitate the adjustment of said circuit for optimum reception.

WILLIAM D. BUCKINGHAM.